United States Patent Office 3,636,059
Patented Jan. 18, 1972

3,636,059
CYCLOPENTENOLONE ESTERS
Masanao Matsui, Tokyo, Takeshi Kitahara, Yono-shi, Keimei Fujimoto, Kyoto, and Yositosi Okuno, Nishinomiya-shi, Japan, assignors to Sumitomo Chemical Company, Ltd., Osaka, Japan
No Drawing. Filed July 17, 1967, Ser. No. 653,684
Claims priority, application Japan, July 20, 1966, 41/47,882
Int. Cl. C07c 64/74, 69/76
U.S. Cl. 260—347.4
12 Claims

ABSTRACT OF THE DISCLOSURE

Novel cyclopropanecarboxylic acid esters of the formula,

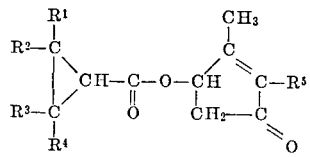

wherein $R^1$ is hydrogen, lower alkyl having 1 to 4 carbon atoms, phenyl, lower alkyl having 1 to 4 carbon atoms-substituted phenyl, or lower alkoxy having 1 to 4 carbon atoms-substituted phenyl, $R^2$, $R^3$ and $R^4$ are lower alkyls having 1 to 4 carbon atoms, and $R^5$ is lower alkyl having 1 to 4 carbon atoms, lower alkenyl having 1 to 4 carbon atoms, cycloalkenyl having 5 to 6 carbon atoms, aralkyl having 6 to 9 carbon atoms, alkadienyl group of 5 carbon atoms or furfuryl. These novel esters are prepared by esterifying a cyclopropanecarboxylic acid having the formula,

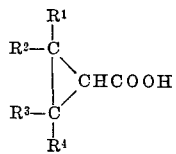

wherein $R^1$, $R^2$, $R^3$ and $R^4$ have the same meanings as above, or its reactive derivative, with a cyclopentenolone compound having the formula,

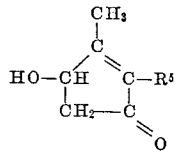

wherein $R^5$ has the same meanings as above. These esters are useful as an insecticide harmless to warm-blood animals.

This invention relates to novel cyclopropanecarboxylic acid esters, to a process for preparing the same, and to insecticidal compositions containing the same.

As an insecticide utilizable wth safety because of the harmlessness to warm-blooded animals, pyrethrum extract has long been employed. The main constituents of the pyrethrum extract are pyrethrin I, II and cinerin I, II, which are esters of cyclopentenolones, i.e. pyrethrolone and cinerolone with chrysanthemic acid or pyrethric acid. Since their structure was determined, synthesis of various analogous compound of pyrethrin and cinerin has been attempted.

As the alcohol moiety of the esters, various derivatives of cyclopentenolone has been synthesized and esterified with chrysanthemic acid or pyrethric acid and the killing effects on insects were tested. As the result, allethrin was synthesized and developed for insecticidal uses.

These pyrethrin, cinerin and allethrin are certainly valuable in their high insecticidal powers, especially in their rapid effect on insects, and in the characteristics of permitting no, or little, resistivity to insects. However, their uses are limited to some extent because of their complicated steps of the production and their great expenses for the production.

As to the acid moiety, various acids having cyclopropane ring has synthesized and esterified with cyclopentenolone compound and the killing effects on insects were tested. However, no acids superior to chrysanthemic acid or pyrethric acid have been found. Namely isobutenyl side chain of the cyclopropane ring have been considered essential.

The present inventors have made broad researches on the various cyclopropanecarboxylic acids as the acid moiety to be esterified with cyclopentenolone compounds and now found that the isobutenyl is not essential concerning the killing effect on insects.

One object of this invention is to provide a novel group of cyclopropanecarboxylic acid esters, which have strong insecticidal activities to household and agricultural insects with low toxicities to warm-blooded animals and plants, and whch can be commercially produced at low cost. Another object is to provide a process for preparing such novel esters by a commercially available procedure. A further object of this invention, is to provide an insecticidal composition containing such an ester.

In order to accomplish these objects this invention provides novel cyclopropanecarboxylic acid esters having the formula,

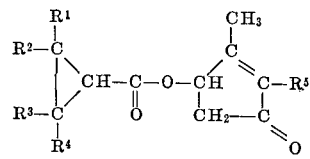

wherein $R^1$ is hydrogen, lower alkyl having 1 to 4 carbon atoms, phenyl, lower alkyl having 1 to 4 carbon atoms-substituted phenyl, or lower alkoxy having 1 to 4 carbon atoms-substituted phenyl, $R^2$, $R^3$ and $R^4$ each are lower alkyls having 1 to 4 carbon atoms, and $R^5$ is lower alkyl having 1 to 4 carbon atoms, lower alkenyl having 1 to 4 carbon atoms, cycloalkenyl having 5 to 6 carbon atoms, aralkyl having 6 to 9 carbon atoms, alkadienyl group of 5 carbon atoms or furfuryl.

Further the present invention provides a process for producing the novel cyclopropanecarboxylic acid esters having the formula as defined above, which comprises reacting a cyclopropanecarboxylic acid having the formula,

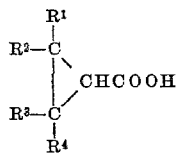

wherein $R^1$, $R^2$, $R^3$ and $R^4$ have the same meanings as identified above, or its reactive derivative, with a cyclopentenolone compound having the formula,

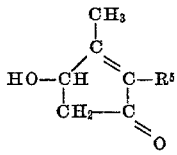

wherein $R^5$ has the same meanings as identified above, according to the general esterifying procedure.

Still further the present invention provides an insecticidal composition comprising a carrier and an insecticidal amount of a cyclopropenecarboxylic acid ester having the formula as defined above as the essential active ingredient.

The present novel group of cyclopropanecarboxylic acid esters possess significant insecticidal power but are harmless to warm-blooded animals, and which can be prepared from easily available materials by a simple process with low costs.

It is significant that the present compounds resemble pyrethrin, cinerin and allethrin, even though the acid moieties of the former are extremely simple as compared to those of the latter, as apparent from the fact that cyclopropanecarboxylic acids employable in the present invention include those having no stereo isomers.

It is also significant that the tetra-substituted on the cyclopropane ring compounds of the present invention possess superior killing effect. (The known compounds were tri-substituted compound.)

The cyclopropanecarboxylic acid employed in this invention may be prepared according to the conventional procedures well-known to those skilled in the art. For instance tetramethylcyclopropanecarboxylic acid is easily obtained by the reaction as shown below.

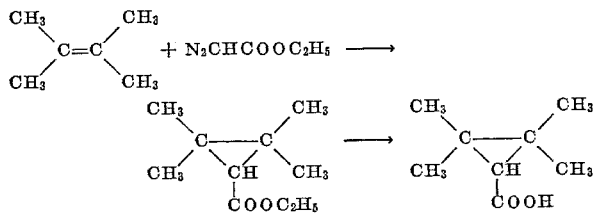

Examples of the cyclopropanecarboxylic acid employed in this invention are as follows.

Cyclopropanecarboxylic acid

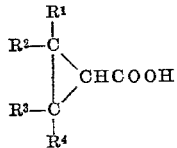

| Compound Number | $R^1$ | $R^2$ | $R^3$ | $R^4$ |
|---|---|---|---|---|
| 1 | H | $CH_3$ | $CH_3$ | $CH_3$ |
| 2 | $CH_3$ | $CH_3$ | $CH_3$ | $CH_3$ |
| 3 | $C_2H_5$ | $CH_3$ | $CH_3$ | $CH_3$ |
| 4 | $C_2H_5$ | $C_2H_5$ | $CH_3$ | $CH_3$ |
| 5 | $C_2H_5$ | $C_2H_5$ | $C_2H_5$ | $C_2H_5$ |
| 6 | $C_6H_5$ | $CH_3$ | $CH_3$ | $CH_3$ |
| 7 | $C_6H_5$ | $C_2H_5$ | $CH_3$ | $CH_3$ |
| 8 | $CH_3$-⟨C_6H_4⟩- | | $CH_3$ | $CH_3$ | $CH_3$ |
| 9 | $CH_3O$-⟨C_6H_4⟩- | | $CH_3$ | $CH_3$ | $CH_3$ |

Examples of the reactive derivatives of the cyclopropanecarboxylic acid are acid halide lower alkyl ester and acid anhydride.

Examples of the cyclopentenolone compound employed in this invention are as follows:

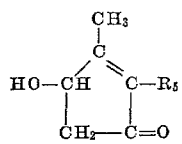

| Compound No. | $R^5$ |
|---|---|
| 10 | $CH_3$ |
| 11 | $C_2H_5$ |
| 12 | $-CH_2CH=CH_2$ |
| 13 | $-CH_2CH=CH.CH_3$ |
| 14 | $-CH_2CH=CH.CH=CH_2$ |
| 15 | $-CH\begin{smallmatrix}CH=CH\\|\\CH_2-CH_2\end{smallmatrix}$ |
| 16 | $-CH_2-\text{(furyl)}$ |
| 17 | $-CH_2-\text{(phenyl)}$ |

The esterification reaction of the present invention may be effected in various ways.

The cyclopentenolone compound may be reacted with the cyclopropanecarboxylic acid in the presence of a de-hydrating agent such as, for example, dicyclohexylcarbodiimide in an inert solvent at room temperature to yield the objective esters in good yield.

It may also be heated with a lower alkyl ester of the cyclopropanecarboxylic acid in the presence of a basic catalyst, such as sodium, potassium, sodium alcoholate and potassium alcoholate, thereby to continuously remove the lower alcohol formed through the trans-esterification out of the reaction system. In such case, methyl, ethyl, n-propyl and isopropyl ester are suitable.

In the most preferable esterification, it may be treated with the cyclopropanecarboxylic acid halide in an inert organic solvent such as e.g. benzene, toluene and n-hexane, preferably in the presence of a de-hydrogen halide agent, such as for example, pyridine, triethylamine and other tertiary amine at room temperature or below room temperature, whereby the esterification proceeds with the isolation of a hydrohalic acid salt within a short period of time. In this case, the acid chloride is the most preferable, though the bromide and the iodide may be employable. The cyclopropanecarboxylic acid halide may be obtained by halogenating the cyclopropanecarboxylic acid with an halogenating agent such as, for example, thionylhalide, phosphorus trihalide and phosgene.

Further the cyclopentenolone compound may be contacted with the cyclopropanecarboxylic acid anhydride and allowed to stand, thereby to yield the objective ester and free cyclopropanecarboxylic acid, the latter being recovered and again converted to the anhydride by treatment with, for example, acetic anhydride or acetylchloride for reuse. In this case, the reaction is preferably conducted under reflux in the presence of an inert solvent, such as, for example, toluene and xylene, as the reaction is completed within a short period of time.

Examples of the cyclopentenolone esters of the present invention are as follows:

| Compound number | Formula |
|---|---|
| 18 | 3'-allyl-2'-methyl-4'-oxo-2'-cyclopentenyl 2,2,3,3-tetramethylcyclopropanecarboxylate |
| 19 | 3'-furfuryl-2'-methyl-4'-oxo-2'-cyclopentenyl 2,2,3,3-tetramethylcyclopropanecarboxylate |
|  | 3'-(2''-cyclopentenyl)-2'-methyl-4'-oxo-2'-cyclopentenyl 2,2,3,3-tetramethylcyclopropanecarboxylate |
| 21 | 3'-allyl-2'-methyl-4'-oxo-2'-cyclopentenyl 2,2,3-trimethylcyclopropanecarboxylate |
| 22 | 3'-furfuryl-2'-methyl-4'-oxo-2'-cyclopentenyl 2,2,3-trimethylcylopropanecarboxylate |
| 23 | 3'-(2''-cyclopentenyl-2'-methyl-4'-oxo-2'-cyclopentenyl 2,2,3-trimethylcyclopropanecarboxylate |
| 24 | 3'-allyl-2'-methyl-4'-oxo-2'-cyclopentenyl 2,3,3-trimethyl-2-phenylcyclopropanecarboxylate |
| 25 |  |

TABLE—Continued

| Compound number | Formula |
|---|---|
| | 3'-allyl-2'-methyl-4'-oxo-2'-cyclopentenyl 3,3-dimethyl-2-ethyl-2-phenyl-cyclopropanecarboxylate |
| 26 | $$\underset{\substack{\text{CH}_3\\|\\\text{CH}_3-\text{C}\\\text{C}_2\text{H}_5-\overset{|}{\text{C}}-\text{CH.C.O}-\text{CH}\\|\quad\quad\|\\\text{CH}_3\quad\text{O}}}{}\underset{\substack{\text{CH}_3\\|\\\text{C}\\\text{CH}_2-\overset{\|}{\text{C}}\\\quad\text{O}}}{}\text{C}-\text{CH}_2-\text{CH}=\text{CH}_2$$ |
| | 3'-allyl-2'-methyl-4'-oxo-2'-cyclopentenyl 2,2,3-trimethyl-3-ethylcyclopropanecarboxylate |
| 7 | (structure) C—CH₃ |
| | 2',3'-dimethyl-4'-oxo-2'-cyclopentenyl 2,2,3,3-tetramethylcyclopropanecarboxylate |
| 28 | (structure) C—CH₂—(phenyl) |
| | 3'-benzyl-2'-methyl-4'-oxo-2'-cyclopentenyl 2,2,3,3-tetramethylcyclopropanecarboxylate |
| 29 | (structure with p-tolyl) C—CH₂—CH=CH₂ |
| | 3'-allyl-2'-methyl-4'-oxo-2'-cyclopentenyl 2,3,3-trimethyl-2-(p-tolyl)-cyclopropanecarboxylate |
| 30 | (structure) C—CH₂—CH=CH—CH=CH₂ |
| | 3'-(2'',4''-pentadienyl)-2'-methyl-4'-oxo-2'-cyclopentenyl 2,2,3,3-tetramethylcyclopropanecarboxylate |
| 31 | (structure) C—CH₂—CH=CH—CH₃ |
| | 3'-(2''-butenyl)-2'-methyl-4'-oxo-2'-cyclopentenyl 2,2,3,3-tetramethylcyclopropanecarboxylate |
| 32 | (structure with C₂H₅ groups) C—CH₂—CH=CH₂ |
| | 3'-allyl-2'-methyl-4'-oxo-2'-cyclopentenyl 2,2-diethyl-3,3-dimethyl-cyclopropanecarboxylate |

TABLE—Continued

| Compound number | Formula |
|---|---|
| 33 | (structure) 3'-allyl-2'-methyl-4'-oxo-2'-cyclopentenyl 2,2,3,3-tetraethylcyclopropanecarboxylate |
| 34 | (structure) 3'-ethyl-2'-methyl-4'-oxo-2'-cyclopentenyl 2,2,3,3-tetramethylcyclopropanecarboxylate |

The following examples are given to illustrate the present invention but not to limit the invention.

EXAMPLE 1

2.0 g. of allethrolone (Compound No. 12) was dissolved in 10 ml. of anhydrous benzene. To the solution, 2.5 ml. of pyridine was added, and the mixture was incorporated, while cooling with ice, with a solution of 2.5 g. of 2,2,3,3-tetramethylcyclopropanecarboxylic acid chloride in 10 ml. of benzene. The reaction vessel was tightly closed and was allowed to stand at room temperature. After 3 hours, the mixture was discharged into ice water and was washed successively with dilute hydrochloric acid, aqueous sodium bicarbonate solution and water. After drying the benzene layer with sodium sulfate, the solvent was distilled under reduced pressure, whereby 3.8 g. of a substantially pure ester was obtained. A part of this ester was taken up and was subjected to distillation to obtain an ester having the structural formula shown below, B.P. 106° C./0.1 mm. Hg, $n_D^{21}$ 1.5050, infra-red absorption 1717 cm.$^{-1}$ (ester), 3095 cm.$^{-1}$, 1640 cm.$^{-1}$, 990 cm.$^{-1}$.

Elementary analysis for $C_{17}H_{24}O_3$.—Calculated (percent): C, 73.6; H, 8.8. Found (percent): C, 73.9; H, 8.8.

EXAMPLE 2

3.0 g. of allethrolone was mixed with 5.5 g. of 2,2,3,3-tetramethylcyclopropanecarboxylic anhydride, and the mixture was allowed to stand at room temperature for 72 hours. Thereafter, the same after-treatments as in Example 1 were effected to obtain 4.3 g. of the same ester as in Example 1.

EXAMPLE 3

Using 2.3 g. of pyrethrolone (Compound No. 14), 2.5 g. of 2,2,3,3-tetramethylcyclopropanecarboxylic acid chloride and 3.0 ml. of triethylamine, the same reaction and after-treatments as in Example 1 were effected, whereby 3.8 g. of an ester was obtained. A part of this ester was taken up and was subjected to distillation to obtain an ester having the structural formula shown below, B.P. 130° C./0.1 mm. Hg (decomposition accompanied), $n_D^{20}$ 1.5185, infra-red absorption 1718 cm.$^{-1}$ (ester), 3095 cm.$^{-1}$, 1640 cm.$^{-1}$, 990 cm.$^{-1}$.

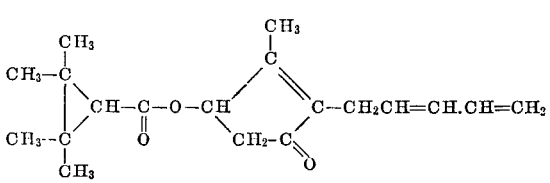

EXAMPLE 4

In the same manner as in Example 1, 2.15 g. of cinerolone (Compound No. 13) was reacted with 2.5 g. of 2,2,3,3 - tetramethylcyclopropanecarboxylic acid chloride in the presence of pyridine, whereby 4 g. of an ester was obtained. A part of this ester was taken up and was subjected to distillation to obtain an ester having the structural formula shown below, B.P. 170° C./0.1 mm. Hg (partially decomposed), $n_D^{20}$ 1.5123, infra-red absorption 1718 cm.$^{-1}$ (ester), 1300 cm.$^{-1}$.

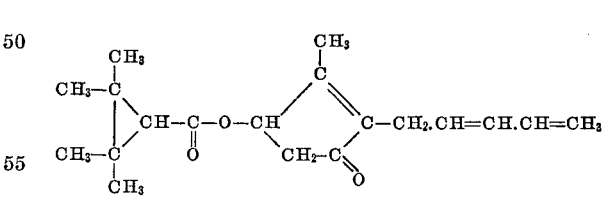

EXAMPLE 5

2.0 g. of allethrolone and 1.9 g. of 2,2,3,3-tetramethylcyclopropanecarboxylic acid (M.P. 121° C.) were dissolved in 40 ml. of dichloromethane. To the solution, 3 g. of dicyclohexylcarbodiimide was added, and the mixture was allowed to stand at room temperature for 24 hours. Deposited dicyclohexylurea was separated by filtration and was subjected to the same after-treatments as in Example 1 to obtain 3.8 g. of an ester having the same physical constants as those of the ester obtained in Example 1.

EXAMPLE 6

In the same manner as in Example 1, 3.0 g. of allethrolone was reacted with 3.0 g. of 1,1,2-trimethylcyclopropanecarboxylic acid chloride (B.P. 90°–92° C./50 mm. Hg) in the presence of 2.5 g. of pyridine. The reaction product was subjected to the same after-treatments as in Example 1 to obtain 4.9 g. of an oily ester having the structural formula shown below, $n_D^{19}$ 1.5040.

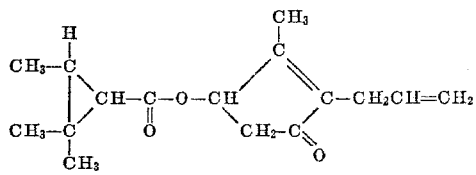

Elementary analysis for $C_{16}H_{22}O_3$.—Calculated (percent): C, 72.9; H, 8.5. Found (percent): C, 73.3; H, 8.4.

EXAMPLE 7

In the same manner as in Example 5, 3.0 g. of allethrolone was reacted with 2.6 g. of 1,1,2-trimethylcyclopropanecarboxylic acid (B.P. 72°–75° C./2 mm. Hg, $n_D^{21}$ 1.4510, anilide M.P. 176° C.) in the presence of 4 g. of dicyclohexylcarbodiimide to obtain 4.5 g. of the same ester as in Example 6.

As mentioned above, the present esters possess superior insecticidal power, and exhibit excellent killing effect on e.g. houseflies, mosquitoes, cockroaches. Moreover, these esters are especially useful for sanitary and domestic purposes, because of their rapid effectiveness and harmlessness.

The present esters are suitably employed for the preparation of insecticidal compositions which have broad uses, correlatively with the low cost.

For the formulation of the insecticidal composition containing the present compound as the essential active ingredient, oil spray, emulsifiable concentrate, wettable powder, dust, aerosol, granules, mosquito coil, fumigant, bait and other preparations, may be formulated using the generally employed carriers, diluents or auxiliary agents, according to the method known to those skilled in the art in the case of the formulation of pyrethrum extract and allethrin. If the compound is crystalline, it is preferably employed as a preliminarily prepared solution in an organic solvent, such as acetone, xylene, methylnaphthalene, etc., depending upon the type of the formulation.

If desired, the present esters may be employed for the preparation of the insecticidal compositions in combination with other insecticidal component, such as pyrethoide, for example, pyrethrum extract and alethrin, organochlorine and organophosphorus compounds carbamate series insecticide, fungicide, acaricide, weeding agent, fertilizer, synergistic agent for pyrethroide, for example, piperonyl butoxide, piperonyl sulfoxide, β - butoxy-β'-thiocyanodiethyl ether and the like. By combination with such other ingredient, the present insecticidal composition can be adapted to broader uses with more increased effect.

Concretely speaking, the present esters may be blended with at least one of pyrethrin, allethrin, O,O-dimethyl-O-(3-methyl-4-nitrophenyl)thiophosphate, malathion, diazinone, dimethoate, γ-BHC, and others, to yield a pesticidal composition which possesses high insecticidal activity with rapid effectivity. In such cases, the both components may be blended in a broad range of proportions, for example, in ratio of 0.05:1 to 1:0.05 by weight of the ester to another insecticidal component.

The preparation and effects of the present compositions will be illustrated in detail below with reference to examples and test examples, but the examples do, of course, not limit the scope of the present invention. All parts and percent are by weight.

EXAMPLE 8

0.2 part of the present compound No. 18 was dissolved in kerosene to make 100 parts, whereby an oil spray was obtained.

EXAMPLE 9

To 0.1 part of the present compound No. 18, 0.5 part of α-[2-(2-butoxyethoxy)-ethoxy]-4,5-methylenedioxy-2-propyltoluene (hereinafter referred to as "piperonyl butoxide") was added, and the mixture was dissolved in kerosene to make 100 parts, whereby an oil spray was obtained.

EXAMPLE 10

0.5 part of the present compound No. 18 was dissolved in 20 ml. of acetone. The solution was homogeneously stirred and mixed with 99.5 part of a mosquito coil carrier (a 5:3:1 mixture of pyrethrum marc, tabu-powder and wood powders). After vaporizing the acetone, the mixture was thoroughly kneaded with 150 part of water, and the resulting slurry was shaped and dried to obtain a mosquito coil.

EXAMPLE 11

20 parts of the present compound No. 18, 10 parts of Sorpol SM–200 (a kind of surface-active agent, registered trade name of a product of Toho Kagaku K.K.) and 70 parts of xylene were stirred, mixed and dissolved to obtain an emulsifiable concentrate.

EXAMPLE 12

0.5 part of the present compound No. 18, 2 parts of p-p'-dichloridiphenyltrichloroethane, 6 parts of xylene and 6.5 parts of deodorized kerosene were mixed, and the mixture was charged in an aerosol container. After attaching a valve portion, the aerosol container was filled under pressure through said valve portion with 85 parts of a propellant (e.g. Freon, vinyl chloride monomer or liquefied petroleum gas), whereby an aerosol was obtained.

EXAMPLE 13

0.3 part of the present compound No. 19 was dissolved in kerosene to make 100 parts, whereby an oil spray was obtained.

EXAMPLE 14

0.5 part of the present compound No. 19, 0.3 part of O,O-dimethyl-O-(3 - methyl - 4 - nitrophenyl)thiophosphate, 6 parts of xylene and 8.2 parts of deodorized kerosene were mixed, and the mixture was treated in the same manner as in Example 12 to obtain an aerosol.

EXAMPLE 15

0.3 part of the present compound No. 20 was dissolved in kerosene to make 100 parts, whereby an oil spray was obtained.

EXAMPLE 16

0.5 part of the present compound No. 20, 2 parts of 2,2 - bis-(p-methoxyphenyl)-1,1,1-trichloroethane, 6 parts of xylene and 6.5 parts of deodorized kerosene were mixed, and the mixture was treated in the same manner as in Example 12 to obtain an aerosol.

EXAMPLE 17

0.5 part of the present compound No. 21 was dissolved in kerosene to make 100 parts, whereby an oil spray was obtained.

EXAMPLE 18

5 parts of the present compound No. 21 was mixed with 5 parts of Toyolignin CT (lignin-sulfonate) (a kind of dispersing agent, registered trade name of a product of Toyoboseki Co., Ltd.) and 90 parts of clay, and the mixture was thoroughly stirred in a mortar. To the mixture, 10% based on the mixture of water was added, and the mixture was further stirred, was then granulated by means of a granulator and was dried in air to obtain a granules.

EXAMPLE 19

0.2 part of the present compound No. 21 was mixed with 0.5 part of O,O-dimethyl-O-(3-methyl-4-nitrophenyl)thiophosphate, and the mixture was dissolved in kerosene to make 100 parts, whereby an oil spray was obtained.

EXAMPLE 20

0.5 part of the present compound No. 23 was dissolved in kerosene to make 100 parts, whereby an oil spray was obtained.

EXAMPLE 21

0.5 part of the present compound No. 23 was mixed with 0.5 part of O,O-dimethyl-O-(3-methyl-4-nitrophenyl)thiophosphate, and the mixture was dissolved in kerosene to make 100 parts, whereby an oil spray was obtained.

EXAMPLE 22

0.2 part of the present compound No. 30 was dissolved in kerosene to make 100 parts, whereby an oil spray was obtained.

EXAMPLE 23

25 parts of the present compound No. 30 was thoroughly mixed with 1.5 parts of surface-active agent and 3.5 parts of lignin. To the mixture. 70 parts of diatomaceous earth was added, and the resulting mixture was thoroughly stirred in a mortar to obtain a wettable powder.

EXAMPLE 24

0.2 part of the present compound No. 30 was mixed with 0.5 part of O,O-dimethyl-O-(3-methyl-4-nitrophenyl)thiophosphate, and the mixture was dissolved in kerosene to make 100 parts, whereby an oil spray was obtained.

EXAMPLE 25

0.4 part of the present compound No. 30, 2 parts of piperonyl butoxide, 2 parts of p,p'-dichlorodiphenyltrichloroethane, 5 parts of xylene and 5.6 parts of deodorized kerosene were mixed, and the mixture was treated in the same manner as in Example 12 to obtain an aerosol.

EXAMPLE 26

1 part of the present compound No. 18 was dissolved in 20 parts of acetone. To the solution, 99 parts of 300 mesh diatomaceous earth was added, and the mixture was thoroughly stirred in a mortar, and was freed from acetone by vaporization to obtain a dust formulation.

The insecticidal effects of the present formulations obtained in the above manners are as shown in the following test examples:

TEST EXAMPLE 1

In this test example were used respective dopes of the oil spray obtained in Examples 8, 13, 15, 17, 20 and 22, and solutions obtained by diluting said dopes to 2 and 4 times by means of kerosene. 5 ml. of each test liquid was sprayed to a group of house fly adults (about 100 adults) according to the Campbell's turn-table method ["Soap and Sanitary Chemicals," vol. 14, No. 6, page 119 (1938)]. After exposure to the sprayed mist for 10 minutes, the house fly adults were taken out, were fed and were placed in a thermostat at 27° C. for one day. Thereafter, the life and death of the house fly adults were observed and the ratio of skilled insects was calculated. The insecticidal effect on houseflies of each oil spray obtained in respective examples was represented by the value of LC 50 (50% lethal concentration) as shown in Table 1.

TABLE 1

Insecticidal composition:
Oil spray of Example—    LC 50 (percent)

| | |
|---|---|
| 8 (Compound No. 18) | 0.130 |
| 13 (Compound No. 19) | 0.143 |
| 15 (Compound No. 20) | 0.115 |
| 17 (Compound No. 21) | 0.280 |
| 20 (Compound No. 23) | 0.193 |
| 22 (Compound No. 30) | 0.069 |
| Allethrin oil spray | 0.095 |
| Pyrethrin oil spray | 0.052 |

TEST EXAMPLE 2

In this test example were used liquids obtained by diluting with kerosene the oil spray obtaind in Examples 8, 13, 15, 17, 20 and 22, so that the liquids contained individually 0.2% of the active insecticidal ingredient. 0.7 ml. of each liquid was uniformly sprayed, under a pressure of 20 pounds by means of a glass-made atomizer, into a (70 cm.)³ glass chamber in which about 20 house fly adults had been released. Thereafter, the number of knocked-down houseflies was observed with time to obtain the value of KT 50 (50% knock-down time). The results were as shown in Table 2.

TABLE 2

Insecticidal composition:
Oil spray of Example—    KT 50 (seconds)

| | |
|---|---|
| 8 (Compound No. 18) | 160 |
| 13 (Compound No. 19) | 125 |
| 15 (Compound No. 20) | 120 |
| 17 (Compound No. 21) | 230 |
| 20 (Compound No. 23) | 195 |
| 22 (Compound No. 30) | 105 |
| Allethrin oil spray 0.2% | 180 |
| Pyrethrin oil spray 0.2% | 120 |

TEST EXAMPLE 3

In this test example were used liquids obtained by diluting with kerosene the oil spray obtained in Examples 8, 13, 15, 17, 20 and 22, so that the liquids contained individually 0.1% of the active insecticidal ingredient. 0.7 ml. of each liquid was uniformly sprayed, under a pressure of 20 pounds by means of a glass-made atomizer, into a (70 cm.)³ glass chamber in which about 20 northern house mosquito adults had been released. Thereafter, the number of knocked-down mosquitoes was observed with time to obtain the value of KT 50 (50% knock-down time). The results were as shown in Table 3.

TABLE 3

Insecticidal composition:
Oil formulation of Example—    KT 50 (seconds)

| | |
|---|---|
| 8 (Compound No. 18) | 63 |
| 13 (Compound No. 19) | 87 |
| 15 (Compound No. 20) | 110 |
| 17 (Compound No. 21) | 110 |
| 20 (Compound No. 23) | 100 |
| 22 (Compound No. 30) | 90 |
| Allethrin oil spray 0.1% | 125 |
| Pyrethrin oil spray 0.1% | 105 |

TEST EXAMPLE 4

Into a (70 cm.)³ glass chamber, about 20 northern house mosquito adults were released. 1 g. of the mosquito coil obtained in Example 10 was ignited on both ends and was placed at the center in said chamber. Thereafter, the number of knocked-down mosquitoes was observed with time to obtain the value of KT 50 (50% knock down-time). The result was as shown in Table 4.

TABLE 4

Insecticidal composition:    KT 50 (min. sec.)

| | |
|---|---|
| Mosquito coil of Example 10 | 4' |
| 0.5% Mosquito coil of— | |
| Pyrethrin | 13' 40" |
| Allethrin | 7' 30" |

TEST EXAMPLE 5

5 ml. of each of the oil spray obtained in Examples 9, 19, 21 and 24 was sprayed to a group of about 100 house fly adults, according to the Campbell's turn table method ["Soap and Sanitary Chemicals," vol. 14, No. 6, page 119 (1938)]. After exposing the house flies to the sprayed mist for 10 minutes, the number of knocked-down insects at this stage was observed, and then the houseflies were taken out, were fed and were placed in a thermostat at 27° C. for one day. Subsequently, the life and death of the houseflies were observed to calculate the ratio of dead insects. The results were as shown in Table 5.

TABLE 5

| Insectidical composition | Knock-down ratio after 10 minutes (percent) | Ratio of killed insects after 1 day (percent) |
|---|---|---|
| Oil spray of Example: | | |
| 9 | 100 | 98 |
| 19 | 100 | 100 |
| 21 | 100 | 100 |
| 24 | 100 | 100 |

TEST EXAMPLE 6

Into a (70 cm.)³ glass chamber, about 20 house fly adults were released. To the houseflies, each of the aerosols obtained in Examples 12, 14, 16 and 25 were sprayed for one second. After 15 minutes, the number of knocked-down insects was observed. Subsequently, only the knocked down insects were collected, were transferred to another observation cage and were fed. After one day, the life and death of the houseflies were observed. The results obtained were as shown in Table 6.

TABLE 6

| Insecticidal composition | Knock-down ratio after 15 minutes (percent) | Ratio of killed insects after 1 day (percent) |
|---|---|---|
| Aerosol of Example: | | |
| 12 | 97 | 62 |
| 14 | 100 | 70 |
| 16 | 100 | 59 |
| 25 | 100 | 77 |

TEST EXAMPLE 7

Into a 300 ml. glass beaker was charged 200 ml. of a liquid prepared by diluting with water to a test concentration each of the emulsifiable concentrate and wettable powder obtained in Examples 11 and 23, respectively. Into the beaker, about 30 full grown larvae of northern house mosquito were released. After 1 day, the life and death of the larvae were observed to obtain the value of LC 50 (50% lethal concentration). The results were as set forth in Table 7.

TABLE 7

| Insecticidal composition | LC 50 (p.p.m.) |
|---|---|
| Emulsifiable concentrate of Example 11 | 0.34 |
| Wettable powder of Example 23 | 0.12 |
| Allethrin emulsifiable concentrate | 0.10 |

TEST EXAMPLE 8

10 litres of water was poured in a 14 litre polyethylene bucket. Into the water was charged 400 mg. of the granules obtained in Example 18. After 1 day, full grown larvae of northern house mosquito were released in the water, and the life and death of larvae were observed. As the result, more than 90% of the larvae could be killed within 24 hours.

TEST EXAMPLE 9

A tall skirted glass dish of 14 cm. in inner diameter and 7 cm. in height was coated on the inner surface wall with butter, leaving an uncoated portion of about 1 cm. in width at the lower part of the wall surface. Onto the bottom of the dish, the dust formulation obtained in Example 26 was uniformly sprinkled in a proportion of 2 g./m.². Into the dish, 10 cockroach adults were released and were contacted with the dust formulation for 30 minutes, whereby 100% of the cockroaches were knocked-down and, after 3 days, 100% of the cockroaches could be killed.

What we claim is:
1. A cyclopropanecarboxylic acid ester of the formula,

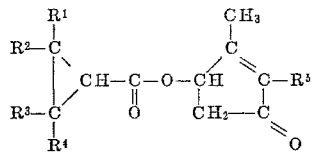

wherein $R^1$ is hydrogen, methyl, ethyl or methyl substituted phenyl, $R^2$, $R^3$ and $R^4$ are methyl or ethyl, and $R^5$ is a lower alkyl having 1 to 4 carbon atoms, a lower alkenyl having 1 to 4 carbon atoms, a cycloalkenyl having 5 or 6 carbon atoms, an aralkyl having 6 to 9 carbon atoms, alkadienyl having 5 carbon atoms or furfuryl.

2. A cyclopropanecarboxylic acid ester according to claim 1 wherein $R^1$ is hydrogen.

3. A cyclopropanecarboxylic acid ester according to claim 1 wherein R is methyl.

4. A cyclopropanecarboxylic acid ester according to claim 1 wherein $R^1$ is methyl substituted phenyl.

5. A cyclopropanecarboxylic acid ester according to claim 1 wherein $R^5$ is a lower alkyl having 1–4 carbon atoms.

6. A cyclopropanecarboxylic acid ester according to claim 1 wherein $R^5$ is a lower alkenyl having 1–4 carbon atoms.

7. A cyclopropanecarboxylic acid ester according to claim 1 wherein $R^5$ is cycloalkenyl having 5–6 carbon atoms.

8. A cyclopropanecarboxylic acid ester according to claim 1 wherein $R^5$ is aralkyl having 6–9 carbon atoms.

9. A cyclopropanecarboxylic acid ester according to claim 1 wherein $R^5$ is an alkadienyl having 5 carbon atoms.

10. A cyclopropanecarboxylic acid ester according to claim 1 wherein $R^5$ is furfuryl.

11. A cyclopropanecarboxylic acid ester of the formula,

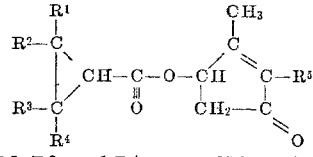

wherein $R^1$, $R^2$, $R^3$, and $R^4$ are —CH₃ and $R^5$ is

—CH₂—CH=CH₂

12. A cyclopropanecarboxylic acid ester of the formula,

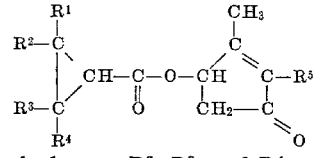

wherein $R^1$ is hydrogen, $R^2$, $R^3$, and $R^4$ are —CH₃ and $R^5$ is —CH₂—CH=CH₂.

References Cited

UNITED STATES PATENTS

| 2,661,374 | 12/1953 | Schechter et al. | 260—586 |
| 2,686,180 | 8/1954 | Schmidt et al. | 260—230 |

FOREIGN PATENTS

| 744,268 | 2/1956 | Great Britain | 260—468 |

OTHER REFERENCES

Farkas et al.—Coll. Czech. Chem. Comm. 25, 1815 (1960).

Farkas et al.—C.A. 52, 13651 e–i, 1958.

LORRAINE A. WEINBERGER, Primary Examiner

R. GERSTL, Assistant Examiner

U.S. Cl. X.R.

260—468 P, 469, 473 R, 514 P, 515 R, 521 R; 424—305, 306, 308

UNITED STATES PATENT OFFICE
CERTIFICATE OF CORRECTION

Patent No. 3,636,059  Dated January 18, 1972

Inventor(s) Matsui et al.

It is certified that error appears in the above-identified patent and that said Letters Patent are hereby corrected as shown below:

In the claim for priority, please insert the following:

-- No. 41/47883 of July 20, 1966 --

Signed and sealed this 15th day of August 1972.

(SEAL)
Attest:

EDWARD M. FLETCHER, JR.
Attesting Officer

ROBERT GOTTSCHALK
Commissioner of Patents